United States Patent Office 2,842,153
Patented July 8, 1958

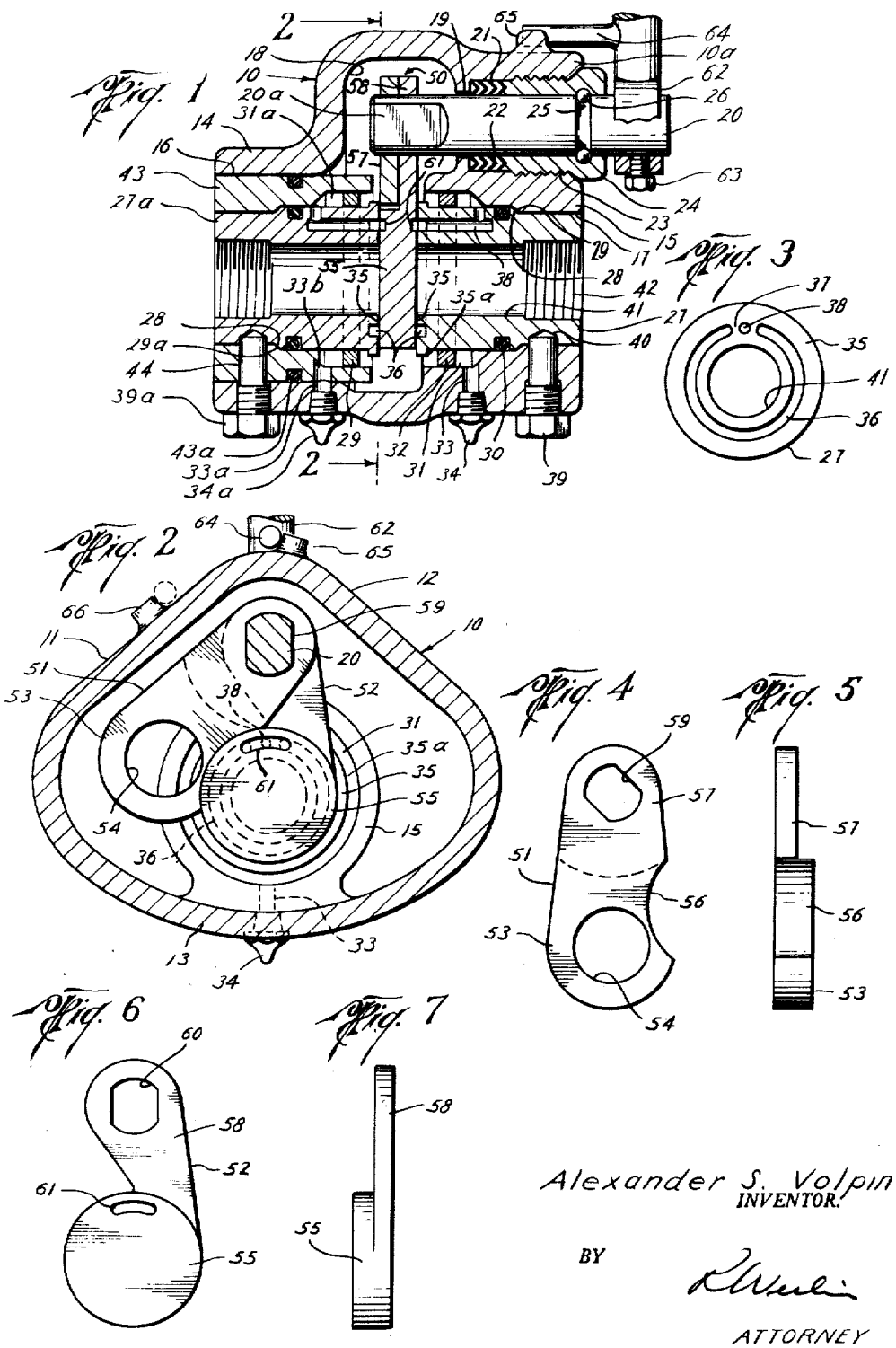

2,842,153

SWING GATE VALVE

Alexander Samuel Volpin, Miami Beach, Fla.

Application February 16, 1955, Serial No. 488,576

6 Claims. (Cl. 137—246.12)

This invention relates to swing gate valves and particularly to swing gate valves employing automatic lubricant sealing.

Conventional swing gate valves embody constructions in which the gate member is swung in an arcuate path across the axis of the flowway to open and close the flowway through the valve. Swing gate valves are commonly employed as so-called "quick opening" valves, where opening and closing of the valve is effected by a single angular movement of the gate.

The present invention is directed to improvements in such valves to provide constructions which are relatively simple and low in cost of manufacture, but which possess numerous advantages, particularly in providing a through-conduit type of construction and a construction which is also particularly adapted for automatic lubricant sealing.

An important object is to provide in a swing gate valve a one-piece body construction; that is, a body in which the more conventional separable body and bonnet construction is eliminated, and the bonnet or closure for the gate chamber is made integral with the body.

Another object is the provision in a swing gate of a double gate construction which comprises a through-conduit portion and a closure portion so arranged that the angular movement required to move the gate between open and closed positions is reduced substantially in comparison with more conventional constructions, thereby reducing the overall dimensions of the valve and cost of construction.

An additional object is the provision of an automatic sealing system in a valve of the class described.

Still another object is the provision in a swing gate valve of a one-piece body construction in which the gates, gate seats and seat nipples are all inserted into the valve through one of the flowway openings in the valve body.

Still another object is the provision in a swing gate valve of a gate member composed of two separable portions, one of which constitutes a through-conduit portion and the other a closure portion, the two portions being arranged in edge-to-edge relation to provide uniform thickness through both portions of the gate for purposes of effective automatic sealing.

Various other objects and advantages of this invention will become more readily apparent from the following detailed description when read in conjunction with the accompanying drawing which illustrates one useful embodiment in accordance with this invention.

In the drawing, Fig. 1 is a longitudinal sectional view of a valve in accordance with an embodiment of this invention;

Fig. 2 is a transverse sectional view taken along line 2—2 of Fig. 1;

Fig. 3 is a front elevation of one of the seat faces of the valve;

Fig. 4 is a side elevation of the through-conduit portion of the gate;

Fig. 5 is an end elevation of the through-conduit portion of the gate;

Fig. 6 is a side elevation of the closure portion of the gate; and

Fig. 7 is an end elevation of the closure portion of the gate.

Referring to the drawing, the valve includes the hollow body, designated generally by the numeral 10, which in transverse cross-sectional view, as seen in Fig. 2, is of a generally triangular shape, including side portions 11, 12 which converge upwardly, and a base portion 13 which is rounded downwardly, as illustrated. Integrally formed with the body are the flow nozzles 14 and 15, either of which may be the inlet, the other being, of course, the outlet. The flow nozzles have co-axial bores 16 and 17, respectively, bore 16 being made substantially larger in diameter than bore 17 for purposes to be described hereinafter. A gate chamber 18 is defined within body 10 intersecting the inner ends of the flow nozzles. The upper portion of body 10, above flow nozzle 15, is provided with a boss 10a having a bore 19 paralleling bores 16 and 17 and extending from the right hand end of the boss into communication with gate chamber 18. Bore 19 is adapted to receive a stem 20 which extends through the bore into the gate chamber. Bore 19 is counter-bored from its outer end to form a stuffing box 21 in which is mounted packing 22 to seal about stem 20, and the outer end of the bore is internally threaded at 23 to receive a gland nut 24 which is employed to compress packing 22 therein. Stem 20 is rotatively journalled in the bore of gland nut 24, adjacent portions of stem 20 and the bore wall of nut 24 being provided with co-operating ball races 25 in which are seated a number of ball bearings 26, providing a generally conventional arrangement which serves both as an anti-friction bearing and as means for locking the stem in the body.

A tubular seat nipple 27, having an axial flow passage 41 therethrough, is seated in bore 17 and provided with an external annular shoulder 28 adapted to engage an internal annular shoulder 29 provided in bore 17 to limit the movement of the seat nipple through bore 17. Seat nipple 27 will be inserted into the body by passing it axially through the larger diameter bore 16 and sliding it into bore 17 until shoulder 28 engages shoulder 29. A packing ring 30, such as an O-ring, is seated in the outer periphery of seat nipple 27 and is adapted to seal between the exterior of the seat nipple and the wall of bore 17.

Bore 17 is counter-bored from its inner end to form the annular chamber 31 surrounding the inner end portion of the seat nipple to form a sealant reservoir. An annular piston 32 is slidably mounted about the exterior of the seat nipple within chamber 31 and is adapted to form a longitudinally slidable barrier in chamber 31 between the exterior of the seat nipple and the opposite wall of chamber 31. Chamber 31 is in communication through its outer end with gate chamber 18. A passage 33 extends through the wall of body 10 and provides communication from the exterior thereof to chamber 31.

A lubricant supply fitting 34, of general conventional form, is connected into passage 33 and provides means through which sealant material may be introduced into chamber 31. The inner end of seat nipple 27 defines the annular gate seat 35 surrounding the flow passage 41 through the seat nipple. The seat portion of the seat nipple is made slightly larger in diameter than the body of the nipple to provide an annular flange 35a which serves as a stop to prevent piston 32 from being forced off the inner end of the seat nipple. A sealant groove 36 is formed in the face of seat 35 radially outside passage 41 and extends substantially entirely around the circumference of the seat, except for a short non-grooved portion 37 (Fig. 4), by which the continuity of the groove is interrupted. A sealant channel 38 opens to the outer face of seat 35 in the portion 37 between the closed ends of the groove. Channel 38 extends longitudinally through the wall of the seat nipple into communication with sealant chamber 31. A set screw 39 extends radially through the wall of body 10 and into a socket 40 formed in the outer surface of seat nipple 27, whereby to lock the seat nipple in the body. The seat nipple 27 may be internally threaded, as at 42, to provide means for connecting this end of the body to a conduit.

A second seat nipple 27a, identical in form and details of construction to seat nipple 27, is mounted in bore 16 in co-axial opposed relation to seat nipple 27. In view of the identical construction of the two seat nipples, it is not deemed necessary to described seat nipple 27a in detail. However, because of the difference in diameter between bore 16 and the external diameter of seat nipple 27a, a filler or spaced sleeve 43 is concentrically installed between seat nipple 27a and the wall of bore 16. Spacer sleeve 43 is provided with an internal shoulder 29a corresponding to shoulder 29 in bore 17 and is adapted to engage shoulder 28 on the seat nipple, to thereby limit outward movement of seat nipple 27a in sleeve 43. A packing element 43a, such as an O-ring, is installed about the exterior of spacer sleeve 43 to seal between the latter and the wall of bore 16. Spacer sleeve 43 is counter-bored from its inner end to form an annular sealant chamber 31a about the exterior of seat nipple 27a, chamber 31a being substantially identical in form and arrangement to sealant chamber 31. An annular piston 32a, identical in form and function with piston 32, is slidably mounted in chamber 31a about the exterior of seat nipple 27a. To lock seat nipple 27a and spacer sleeve 43 into the valve body, a set screw 39a is screwed radially through opening 44 in the spacer sleeve, and thence into the socket 40a provided in the exterior of seat nipple 27a.

A sealant supply passage 33a extends through the wall of body 10 into registration with a passage 33b extending radially through spacer sleeve 43 to provide communication from the exterior of body 10 to sealant reservoir 31a. A lubricant supply fitting 34a, like fitting 34, is connected into passage 33a for the supply of sealing material therethrough to reservoir 31a.

Mounted in gate chamber 18 between the seats 35 of the opposing seat nipples is a gate, designated generally by the numeral 50. The gate is secured to the inner end of stem 20 and arranged, as will be subsequently described, to be swung by angular movement of the stem along an arcuate path lying in a plane normal to the longitudinal axis of flow passages 41.

Gate 50 comprises a pair of gate elements including a through-conduit gate element 51 (Figs. 4 and 5) and a closure gate element 52 (Figs. 6 and 7). Through-conduit element 51 has a flat sided seat-engaging portion 53 having an opening 54 therethrough adapted to register with flow passages 41 when gate 50 is in the valve opening position. Closure element 52 includes a flat-sided, circular seat engaging portion 55, the sides of which are adapted to be engaged with the opposing seats 35 when the gate is in the valve-closing position (Fig. 2). Seat engaging portions 53 and 55 are made to the same thickness and are arranged in edge-to-edge relation (Fig. 2), portion 53 being provided at one edge with the arcuate recess 56 into which the adjacent sector of portion 55 extends. Seat engaging portions 53 and 55 are secured to elongated operating arms 57 and 58, respectively, which are of reduced thickness relative to their respective seat-engaging portions, and are off-set from the inner faces of the respective seat-engaging portions (Figs. 5 and 7) so that when the seat-engaging portions are arranged in their edge-to-edge relation, arms 57 and 58 may be placed in over-lapping face-to-face relation to provide an over-all thickness substantially the same as that of the seat-engaging portions. The over-lapping ends of arms 57 and 58 are provided with non-round openings 59 and 60, respectively, adapted to receive the inner end of operating stem 20 which is provided with flat 20a or other non-round configuration forming a key to complement the configuration of openings 59 and 60 so that the arms 57 and 58 will be non-rotatively secured to the stem and will be swung by the stem in accordance with its angular movement. Openings 59 and 60 will be oriented in their respective operating arms so as to be in registration with each other for reception of stem 20 when gate elements 51 and 52 are disposed in their normal edge-to-edge relation (Fig. 2).

Arcuate recesses 61—61 are provided in the opposite side faces of closure portion 55 (Figs. 1 and 6) near the upper edges thereof, being positioned therein so that when the gate is in the valve-closing position (Fig. 2), recesses 61—61 will register with sealant passages 38. The length of recesses 61 is made such as to span non-grooved portions 37 and over-lap the adjacent closed ends of grooves 36, to thereby place sealant passages 38 in communication with the adjacent ends of grooves 36. It will be evident that with this arrangement, when closure portion 55 begins to move off of the seats 35 toward the valve-opening position, recesses 61—61 will be displaced sufficiently to cut off communication between the sealant supply passages 38 and grooves 36.

An operating handle 62 is mounted on the outer end of stem 20 and is removably secured thereto by means of a set screw 63. Operating handle 62 carries a finger 64 which projects over the outside of body 10. Finger 64 is disposed so as to engage a pair of spaced limit stops 65, 66 mounted on the exterior of body 10 along the path of movement of finger 64 and spaced apart by a distance corresponding to the angular swing of the gate between valve-opening and valve-closing positions.

The various parts are installed in the one-piece body substantially as follows: A piston 32 will be mounted on seat nipple 27 and the latter will be inserted, as previously noted, through bore 16 into the body and slipped into bore 17 until shoulder 28 comes up against shoulder 29. Set screw 39 will then be inserted and made up to lock seat nipple 27 in place in bore 17. Stem 20 will be inserted through gland nut 24 and extended through bore 19 into the gate chamber. Gate element 52 will then be inserted through bore 16 into the gate chamber and secured to stem 20 by inserting the inner end of the stem into opening 60. Gate element 51 will next be inserted through bore 16 into the gate chamber and opening 59 will be worked over the end of stem 20 to secure the gate element to the stem and to position the gate elements in their required edge-to-edge relation. Seat nipple 27a will then have a piston 32 placed thereon and the nipple bearing the piston will be inserted into the bore of spacer sleeve 43 from the inner end thereof until shoulder 28 of the nipple abuts shoulder 29a in the interior of the spacer nipple. The sub-assembly so-formed will then be inserted into bore 16 and pushed into position relative to the seat on the inner end of seat nipple 27 so that the opposite faces of the gate elements will slidably engage the opposed seats. Set screw 39a will now be inserted and made up in order to lock seat nipple 27a and spacer sleeve 43 in position. Gland nut 24 will also be made up as required to compress packing 22 and to position stem 20. Handle 62 will be installed to complete the valve.

In operation, it will be seen that angular movement of the stem will swing gate 50 between the valve-closing position, in which closure portion 55 is positioned over the gate seats, and the valve-opening position, in which through-conduit portion 53 is in registration with the gate seats. The edge-to-edge arrangement of the gate elements, and particularly the arrangement in which closure portion 55 is partially inserted into the edge of the through-conduit portion, reduces the over-all angle of movement necessary to move the gate between the valve-opening and the valve-closing positions.

The automatic lubricant sealing system operates in the following manner: With the valve installed in a fluid flow line, when the gate is closed, closure portion 55 being moved to the closed position over the gate seats, the resulting unbalanced pressure across the gate will move the latter slightly toward the downstream seat, allowing the higher fluid pressure to enter the gate chamber and exert its force through the open end of the downstream sealant reservoir against the ring piston. The latter will then urge sealant from the reservoir through passage 38 and recess 61 into the groove 36 in the downstream seat, thereby automatically forming a lubricant seal between the downstream seat and the gate.

In the above-described double edge-to-edge gate arrangement, the uniform thickness of closure portion 55 and through-conduit portion 53 provided thereby, is also particularly useful in connection with the automatic sealing system, in that a continuous closure will be provided for the sealant discharge passages 38 from the very first opening movement of the gate to completion thereof because some part of the body of either portion 55 or portion 53 will always over-lie passages 38 at all stages of the opening movement after the ends of recesses 61 has moved out of registration with at least one end of grooves 36. This arrangement will prevent excessive losses of sealant and will also provide protection for gate seats when the valve is open.

It will be evident from the foregoing that the present invention provides an improved swing gate construction employing a novel dual gate arrangement and automatic lubricant sealing. Although a gate member employing separable gate elements is preferred, particularly in connection with the one-piece body construction of the illustrative embodiment, it will be evident that in a valve having the more conventional separable body and bonnet construction, the gate member 50 may be constructed as a single integral body having the over-all generally triangular shape shown and having the closure portion 55 and the through-conduit portion 53 in laterally spaced relation along the base portion of the gate body.

It will be understood that numerous modifications and alterations may be made in the details of the illustrative embodiment within the scope of the appended claims but without departing from the spirit of this invention.

What I claim and desire to secure by Letters Patent is:

1. A swing gate valve, comprising, a hollow body having a flowway therethrough, a gate chamber intersecting the flowway, gate seats in the flowway on opposite sides of the gate chamber, and a gate member in the gate chamber swingable therein between said seats transversely of the flowway axis, said gate member comprising separable perforate and imperforate seat-engaging portions disposed in contiguous edge-to-edge relation selectively movable into registration with the flowway in accordance with the angular movement of the gate member across the flowway to thereby open and close the flowway, said gate portions and said flowway being relatively dimensioned to permit said gate portions to be inserted into the gate chamber through the flowway to install the gate member in the gate chamber.

2. A swing gate valve, comprising, a hollow body having a flowway therethrough, a gate chamber intersecting the flowway, gate seats in the flowway on opposite sides of the gate chamber, and a gate member in the gate chamber swingable therein between said seats transversely of the flowway axis, said gate member comprising separable perforate and imperforate seat-engaging portions disposed in contiguous edge-to-edge relation selectively movable into registration with the flowway in accordance with the angular movement of the gate member across the flowway to thereby open and close the flowway, one of said portions having a concave recess in the edge thereof to receive an edge segment of the other of said portions whereby to reduce the degree of angular movement of the gate member between the flowway-opening and the flowway-closing positions, said gate portions and said flowway being relatively dimensioned to permit said gate portions to be inserted into the gate chamber through the flowway to install the gate member in the gate chamber.

3. In a swing gate valve, a hollow body of one-piece construction having a flowway extending therethrough, a gate chamber intersecting the flowway, tubular seat nipples removably mounted in the opposite ends of the flowway, the inner ends of said seat nipples defining gate seats about the flowway on opposite sides of the gate chamber, and a gate member in the gate chamber swingable therein between said seats transversely of the flowway axis, said gate member comprising separable perforate and imperforate gate sections disposed in contiguous edge-to-edge relation, said gate sections and said flowway being relatively dimensioned to permit said gate sections to be inserted into the gate chamber through the flowway to install the gate member in the gate chamber.

4. In a swing gate valve having a flowway therethrough, a gate member for opening and closing said flowway comprising a pair of separable gate elements, one of said elements having a perforate through-conduit portion, and the other of said elements having an imperforate closure portion, said portions being substantially flat and of substantially uniform thickness and arranged in contiguous edge-to-edge relation, one of said portions having a concave recess in the edge thereof to receive a segment of the edge of the other portion, said gate elements and said flowway being relatively dimensioned to permit said gate elements to be inserted into the gate chamber through the flowway to install the gate member in the gate chamber.

5. A swing gate valve, comprising, a hollow body having a flowway therethrough, a gate chamber intersecting the flowway, gate seats in the flowway on opposite sides of the gate chamber, a gate member in the gate chamber swingable therein between said seats transversely of the flowway axis, said gate member comprising separable perforate and imperforate seat-engaging portions disposed in contiguous edge-to-edge relation selectively movable into registration with said flowway in accordance with the angular movement of the gate member across the flowway to thereby open and close the flowway, said gate portions and said flowway being relatively dimensioned to permit said gate portions to be inserted into the gate chamber through the flowway to install the gate member in the gate chamber, sealant grooves about the flowway between said seats and the seat-engaging portions of said gate member, and means responsive to fluid pressure in said body to supply sealant material to said grooves.

6. A swing gate valve, comprising, a hollow body having a flowway therethrough, a gate chamber intersecting the flowway, gate seats in the flowway on opposite sides of the gate chamber, a gate member in the gate chamber swingable therein between said seats transversely of the flowway axis, said gate member comprising separable perforate and imperforate seat-engaging portions disposed in contiguous edge-to-edge relation selectively movable into registration with said flowway in accordance with the angular movement of the gate member across the flowway to thereby open and close said flowway, said gate portions and said flowway being relatively dimensioned to permit said gate portions to be inserted into the gate chamber through the flowway to install the gate member in the gate chamber, sealant grooves about the flowway between said seats and the seat-engaging portions of said gate member, sealant reservoirs in said body exposed to fluid pressure therein, and means responsive to the fluid pressure in said body to convey sealant material from the reservoirs to said grooves.

References Cited in the file of this patent

UNITED STATES PATENTS

| | | |
|---|---|---|
| 1,197,635 | Hunter | Sept. 12, 1916 |
| 1,214,645 | Boyden | Feb. 6, 1917 |
| 1,609,894 | Trent | Dec. 7, 1926 |
| 1,798,952 | Pellegrino | Mar. 31, 1931 |
| 1,999,592 | Leach | Apr. 30, 1935 |
| 2,383,099 | Wiehl | Aug. 21, 1945 |
| 2,570,413 | Volpin | Oct. 9, 1951 |
| 2,653,789 | Eichenberg | Sept. 29, 1953 |

FOREIGN PATENTS

| | | |
|---|---|---|
| 434,557 | Great Britain | Sept. 4, 1935 |